Oct. 15, 1957  R. T. OETERS  2,809,490
HANDLE FOR LAWN MOWERS
Filed Oct. 6, 1953  2 Sheets-Sheet 1
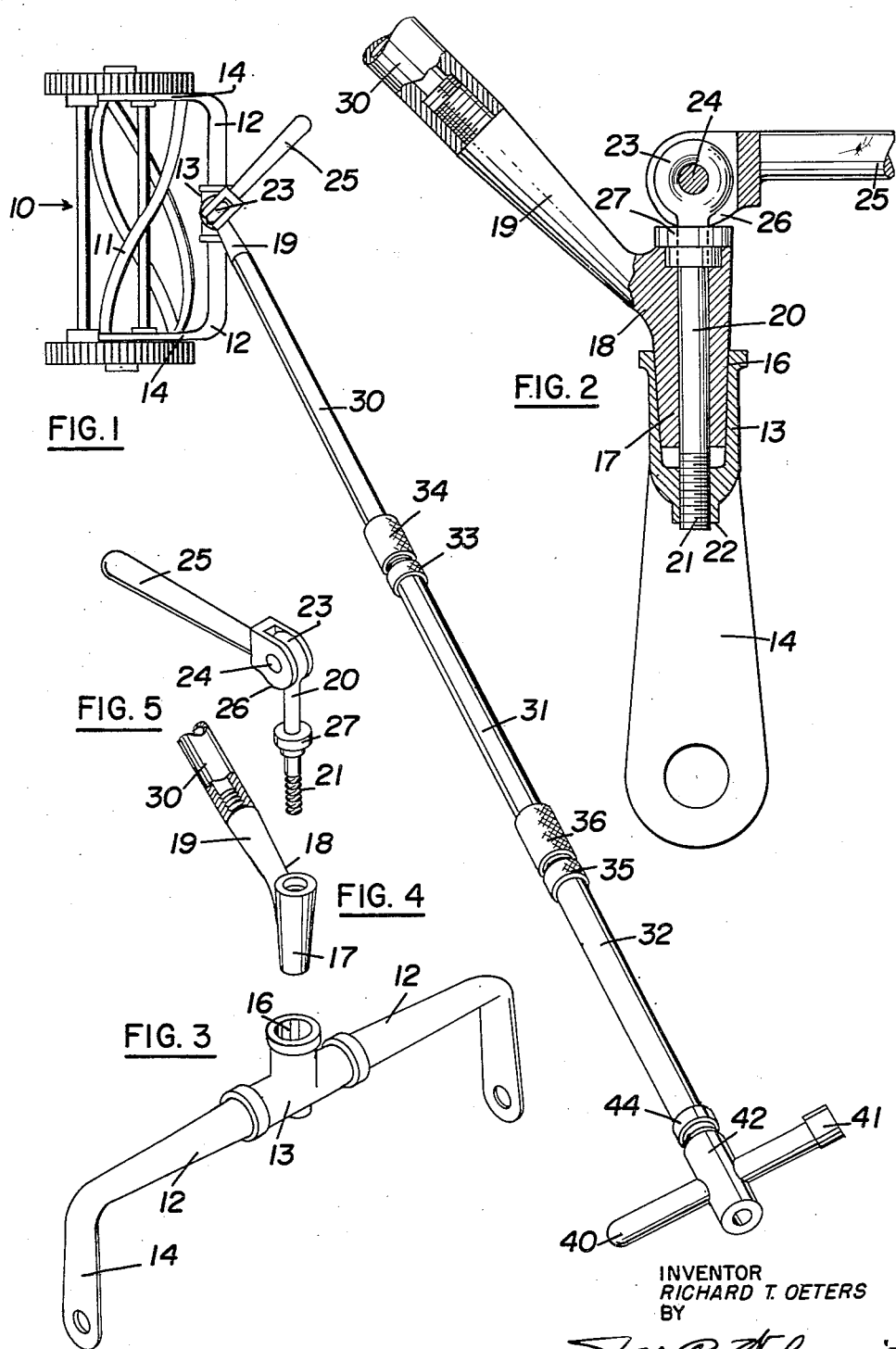
INVENTOR
RICHARD T. OETERS
BY
Jas. C. Nobeersmith
ATTORNEY

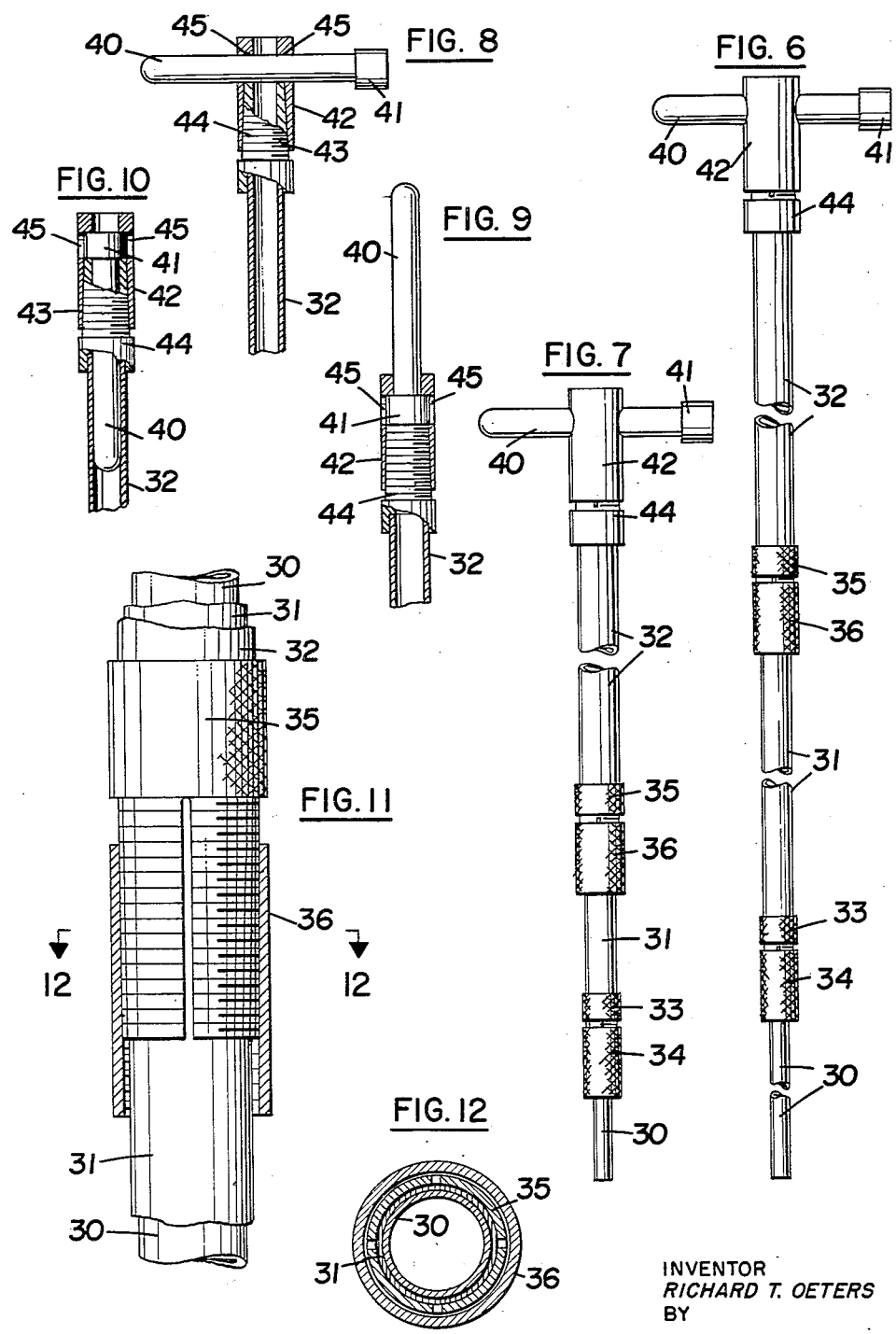

United States Patent Office
2,809,490
Patented Oct. 15, 1957

2,809,490

HANDLE FOR LAWN MOWERS

Richard T. Oeters, Philadelphia, Pa.

Application October 6, 1953, Serial No. 384,427

5 Claims. (Cl. 56—249)

This invention relates to lawn mowers, and it relates more particularly to the construction and arrangement of the handle portions of a lawn mower.

Considerable difficulty has heretofore been encountered in the mowing of lawn grass on terraces or embankments, and while numerous attempts have been made to provide lawn mowers with handles angularly adjustable with respect to the operating parts, none of these, however, have proved entirely satisfactory in practice.

Also, it sometimes occurs that lawn grass, particularly under low hanging trees or similar places, is difficult to mow with lawn mowers provided with handle portions of the usual and conventional kind.

The principal object of the present invention is to provide a handle for a lawn mower which will greatly enhance the usefulness thereof, in that a lawn mower provided with such a handle may be used, not only in the ordinary way for the mowing of flat or substantially flat lawns, but which also is so constructed and arranged whereby the same may be adjusted for the purpose of mowing inclined surfaces, such as banks and terraces, even though the same may be of considerable height.

A further object of the invention is to provide a lawn mower handle, of the character aforesaid, which may also be used for mowing grass in otherwise inaccessible places such, for example, as under low hanging trees and bushes.

A further object of the invention is to provide a lawn mower handle, of the character aforesaid, which will not only be efficient in its operation, but which will be relatively inexpensive in construction.

A further object of the invention is to provide a lawn mower handle, of the character aforesaid, which may be readily and quickly adjusted and changed for use for various conditions without the necessity of using other tools and separate devices to effect the adjustments.

The nature and characteristic features of the present invention will be more readily understood from the following description taken in connection with the accompanying drawings forming part hereof, in which:

Figure 1 is a plan view of a lawn mower provided with a handle embodying the main features of the present invention, the handle being shown in an adjusted position for the mowing of an inclined bank or terrace;

Fig. 2 is a detail view, partly in section and partly in elevation, enlarged, illustrating the connection between the staff portion of the handle and the bail member or yoke;

Fig. 3 is an enlarged perspective view of the bail member detached;

Fig. 4 is an enlarged perspective view of a pivotal member used for connecting the staff portion to the bail member, the same being shown with a part thereof broken away to illustrate the attachment of the staff thereto;

Fig. 5 is an enlarged perspective view of a bolt member and associated parts for securing the pivotal member to the bail member;

Fig. 6 is a side elevation of the staff portion of the handle, the same being shown in an extended condition;

Fig. 7 is a similar view but with parts of the staff portion of the handle partially telescoped with respect to each other;

Fig. 8 is a view, partly in elevation and partly in section, illustrating the manner of mounting a transverse handle bar at the outer end of the staff portion of the handle;

Fig. 9 is a similar view, illustrating the handle bar member in position to provide an additional extension of the staff portion;

Fig. 10 is another similar view illustrating the handle bar member stowed in the end of the outermost tubular member of the staff portion;

Fig. 11 is a sectional detail view enlarged illustrating more particularly preferred means used for clamping the telescoped sections of the staff portion in various adjusted positions; and Fig. 12 is a transverse section taken on the line 12—12 of Fig. 11.

It should, of course, be understood that the description and drawings herein are illustrative merely, and that various modifications and changes may be made in the construction and arrangement shown without departing from the spirit of the invention.

Referring to the drawings, the lawn mower proper 10 is preferably of the rotating reel type, to which the staff portion of the handle of the present invention is connected by a bail member having its main transverse portion extending substantially parallel to the axis of the cutter reel 11. The transverse portion of the bail member preferably consists of two tubular portions 12, secured in a central fitting 13, and each of said tubular members 12 has a flattened bent-over end portion 14 which is pivotally connected to the frame of the lawn mower on each side in the usual manner.

The bail member commonly used in lawn mowers of the conventional type has a limited range of movement with respect to the mower proper, which limitation is ordinarily effected by the provision, on the inner face of the side portions of the frame of the mower, of lugs which serve to prevent the handle from being swung above or below a predetermined angular relationship with the operating parts of the mower.

In the use of the handle parts of the present invention it is preferred that these lugs be removed when said handle parts are applied to an existing mower and, of course, omitted in new mowers. It has been found in practice that, in the use of the device of the present invention the omission of the limiting lugs permits greater flexibility in such use.

The central fitting 13 of the bail member is provided with an internal pocket 16, preferably of frusto-conical form, the axis thereof being disposed at a right angle to the transverse portions 12 of the bail member. In the pocket 16 there is mounted a complementally shaped frusto-conical arm 17 of a pivotal member 18. The pivotal member 18 is also provided with an arm 19 extending outwardly at an angle of approximately 45 degrees to the axis of the arm 17, and the arrangement is such that said arm 19 of the pivotal member 18 may be swung around the axis of the arm 17 to any desired position, and secured in such position.

An eye bolt 20 extends through the arm 17 of the pivotal member 18, and one end thereof is threaded as at 21 in a complementally threaded portion 22 of the central fitting 13. The other end of the bolt 20 has an eye portion 23 through which a transverse pin 24 extends. The pin 24 serves as a means for the pivotal connection of a clamping arm 25 which is provided with a cam surface as at 26, adapted to bear against the outer face of a bushing 27 mounted on the bolt 20 and seated on the upper end of the pivotal member 18.

The foregoing arrangement is such that the handle 25 may be used to rotate the bolt 20 thereby to cause the same to be advanced by reason of the threaded connection of said bolt 20 with the portion 22 of the fitting, and also, by the use of the cam 26, to effect a final and positive clamping of the pivotal member 13 with the staff which is connected thereto disposed in any desired pivotal adjustment about the axis of the member 17 thereof.

The outer end of the arm 19 of the pivotal member 18 is threaded into the otherwise free end of a tubular member 30 forming part of the staff portion of the handle.

The staff portion of the handle preferably comprises three tubular members 30, 31 and 32. The tubular member 30 of the staff is telescoped in the member 31, and likewise the member 31 is telescoped in the member 32. The intermediate tubular member 31 carries, at the end into which the tubular member 30 extends, a split sleeve 33 which is externally tapered and threaded, and this slitted tapered, and threaded portion is engaged by a complementally tapered and threaded sleeve 34 the external surface of which is knurled for convenient hand manipulation.

Likewise, the end of the tubular member 32, into which the tubular member 31 extends, is provided with a similar split tapered and threaded sleeve 35, which in turn is engaged by a complementally tapered and threaded sleeve 36 also having its external surface knurled similar to the sleeve 34.

The foregoing arrangement is such that by loosening the knurled sleeves 34 and 36, the staff may be extended or retracted in length to suit conditions of use, as desired by the user, and upon the tightening of the sleeves 34 and 36 the adjusted length of the staff will remain fixed.

For the purpose of providing a handle bar, a tubular member 40 may be provided, of such external size that the same may be placed within the end of the tubular member 32 most remote from the mower proper. This handle bar member 40 is also provided with a cap 41 at one end providing a shouldered portion which is adapted to be seated at the end of the tubular member 32 and held in position by means of a sleeve 42 internally threaded complemental to threads 43 provided on a sleeve 44 mounted on the end of the tubular member 32. The sleeve member 42 is also shouldered internally complemental to the shouldered end of the bar 40.

The sleeve member 42 is also provided with transverse apertures 45 located near the end thereof and through which the handle bar member 40 is adapted to extend. The arrangement is such that when the handle bar member 40 is positioned in the apertures 45, and the sleeve member 42 is screwed on the sleeve 44 on the end of the tubular member 32, the end face of said sleeve 44 will serve to clamp the handle bar member in position in the apertures 45 as shown in Fig. 8 of the drawings.

The handle bar member 40 is also adapted, when mounted at the end of the tubular member 32 in the manner shown in Fig. 5 of the drawings, to serve as an additional extension of the staff.

When, however, it is not desired to use the member 40 in either of the foregoing positions, it may be placed within the interior at the end of tubular member 32 of the staff, as shown in Fig. 10 of the drawings.

By the foregoing arrangement there is provided a handle structure for lawn mowers which will greatly enhance the usefulness of the mower proper, enabling the grass to be cut on inclined surfaces, terraces and banks, operating from either the upper or lower level surfaces, even though the terraces or banks are of considerable heights, and permitting the mowing to be done either in horizontal or in up and down courses.

Also, by proper adjustment of the parts, as desired by the user, the lawn mower may be used for cutting of grass in relatively inaccessible places such, for example, as under low hanging limbs of trees and bushes.

It has been found in practice that with a lawn mower provided with handle parts made in accordance with the present invention, the use thereof is greatly facilitated, particularly in the mowing of grass on terraces and banks and in other difficult places. Moreover, the adaptability of such a mower does not in any way interfere with the use of the mower in the ordinary way upon relatively flat and level surfaces.

The arrangement is particularly useful in that no special or separate tools are needed to effect the adjustment of the parts for operation under various conditions, and the invention has been found to be practical and very useful.

I claim:

1. In a lawn mower handle structure, a bail member having side legs pivotally connected to the frame of the cutter mechanism of the mower, a staff, and means for connecting the staff to the bail member comprising a member having one portion pivotally connected to a portion of the bail member with the pivotal axis at a right angle to the transverse extension of the bail member and substantially in the plane of the legs of the bail member, and another portion disposed at an obtuse angle thereto and to which one end of the staff is secured, the arrangement being such that the staff may be disposed in desired positions in a conical path about the aforesaid pivotal axis.

2. A lawn mower handle structure as defined in claim 1, having a device for securing the pivotal member thereby to maintain the staff in any desired position in the conical path.

3. A lawn mower handle structure as defined in claim 1, having a device for securing the pivotal member thereby to maintain the staff in any desired position in the conical path, said device including a bolt passing through one portion of the connecting member and threaded into another portion thereof.

4. A lawn mower handle structure as defined in claim 1, having a device for securing the pivotal member thereby to maintain the staff in any desired position in the conical path, said device including a bolt passing through one portion of the connecting member and threaded into another portion thereof, and a manually actuatable member for tensioning said bolt.

5. A lawn mower handle structure as defined in claim 1, having a device for securing the pivotal member thereby to maintain the staff in any desired position in the conical path, and the staff comprising a plurality of tubular sections telescoped within each other and having devices for securing said sections to each other.

References Cited in the file of this patent

UNITED STATES PATENTS

| | | |
|---|---|---|
| 1,389,249 | Kitchel | Aug. 30, 1921 |
| 1,850,326 | Kelly | Mar. 22, 1932 |
| 1,876,963 | Klass | Sept. 13, 1932 |
| 2,252,126 | Kersey | Aug. 12, 1941 |
| 2,511,160 | Grobowski | June 13, 1950 |
| 2,602,953 | Dalglish et al. | July 15, 1952 |